US012659853B2

(12) United States Patent
Eleftheriadis et al.

(10) Patent No.: US 12,659,853 B2
(45) Date of Patent: Jun. 16, 2026

(54) POWER SUPPLY CONTROL METHOD

(71) Applicant: Telefonaktiebolaget LM Ericsson (publ), Stockholm (SE)

(72) Inventors: Lackis Eleftheriadis, Valbo (SE); Arpit Sisodia, Noida (IN); Athanasios Karapantelakis, Solna (SE); Konstantinos Vandikas, Solna (SE); Marin Orlic, Bromma (SE); Oleg Gorbatov, Luleå (SE); Sunil Kumar Vuppala, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 18/279,795

(22) PCT Filed: Mar. 2, 2021

(86) PCT No.: PCT/EP2021/055128
§ 371 (c)(1),
(2) Date: Aug. 31, 2023

(87) PCT Pub. No.: WO2022/184234
PCT Pub. Date: Sep. 9, 2022

(65) Prior Publication Data
US 2024/0137861 A1    Apr. 25, 2024
US 2024/0236845 A9    Jul. 11, 2024

(51) Int. Cl.
*H04W 52/02*    (2009.01)
*H04W 24/02*    (2009.01)

(52) U.S. Cl.
CPC ....... *H04W 52/0206* (2013.01); *H04W 24/02* (2013.01)

(58) Field of Classification Search
CPC .......................... H04W 52/0206; H04W 24/02
See application file for complete search history.

(56) References Cited

U.S. PATENT DOCUMENTS 10,648,685 B2    5/2020    Cho et al.
10,887,851 B1 *    1/2021    Zhang ................... H04W 52/46
(Continued)

FOREIGN PATENT DOCUMENTS

EP    3289651 A1    3/2018
WO    2020069736 A1    4/2020
WO    2020126043 A1    6/2020

OTHER PUBLICATIONS

International Search Report and Written Opinion of the International Searching Authority, PCT/EP2021/055128, mailed Nov. 23, 2021, 15 pages.
(Continued)

*Primary Examiner* — David Bilodeau
(74) *Attorney, Agent, or Firm* — Sage Patent Group

(57) ABSTRACT

Methods and systems for power supply unit (PSU) control. A method includes measuring one or more properties of the PSU to obtain property measurements, and initiating transmission of the property measurements to a machine learning (ML) agent hosting a trained ML model. The method further includes receiving the property measurements at the ML agent, and processing the received property measurements using the trained ML model to generate suggested actions to be taken by the PSU. The method further includes predicting the effect of each of the suggested actions on the measured PSU properties, and selecting a subset of the suggested actions predicted to have a significant impact on the measured PSU properties. The method further includes initiating transmission of the selected subset of suggested actions to the PSU, and performing, at the PSU, the selected subset of suggested actions.

20 Claims, 10 Drawing Sheets

(56) References Cited

U.S. PATENT DOCUMENTS

| | | | |
|---|---|---|---|
| 2016/0320818 A1 * | 11/2016 | Huang | G06N 20/00 |
| 2017/0117841 A1 | 4/2017 | Watanabe et al. | |
| 2019/0310291 A1 | 10/2019 | Lee et al. | |
| 2019/0335353 A1 | 10/2019 | Kocagoez | |
| 2020/0050920 A1 | 2/2020 | Idgunji et al. | |
| 2020/0089216 A1 | 3/2020 | Cella et al. | |
| 2020/0302318 A1 | 9/2020 | Hetherington et al. | |
| 2022/0094609 A1 * | 3/2022 | Guntuku | G06F 3/04847 |
| 2023/0135872 A1 * | 5/2023 | Singh | H04L 43/08 |
| | | | 370/318 |

OTHER PUBLICATIONS

Ribeiro, Marco Tulio et al., "'Why Should I Trust You?' Explaining the Predictions of any Classifier," ACM SIGKDD International Conference on Knowledge Discovery and Data Mining (KDD), arXiv:1602.04938v3, Aug. 9, 2016, 10 pages.
Lundberg, Scott M. et al., "A Unified Approach to Interpreting Model Predictions," 31st Conference on Neural Information Processing Systems (NIPS 2017), Long Beach, California, USA, 10 pages.

* cited by examiner

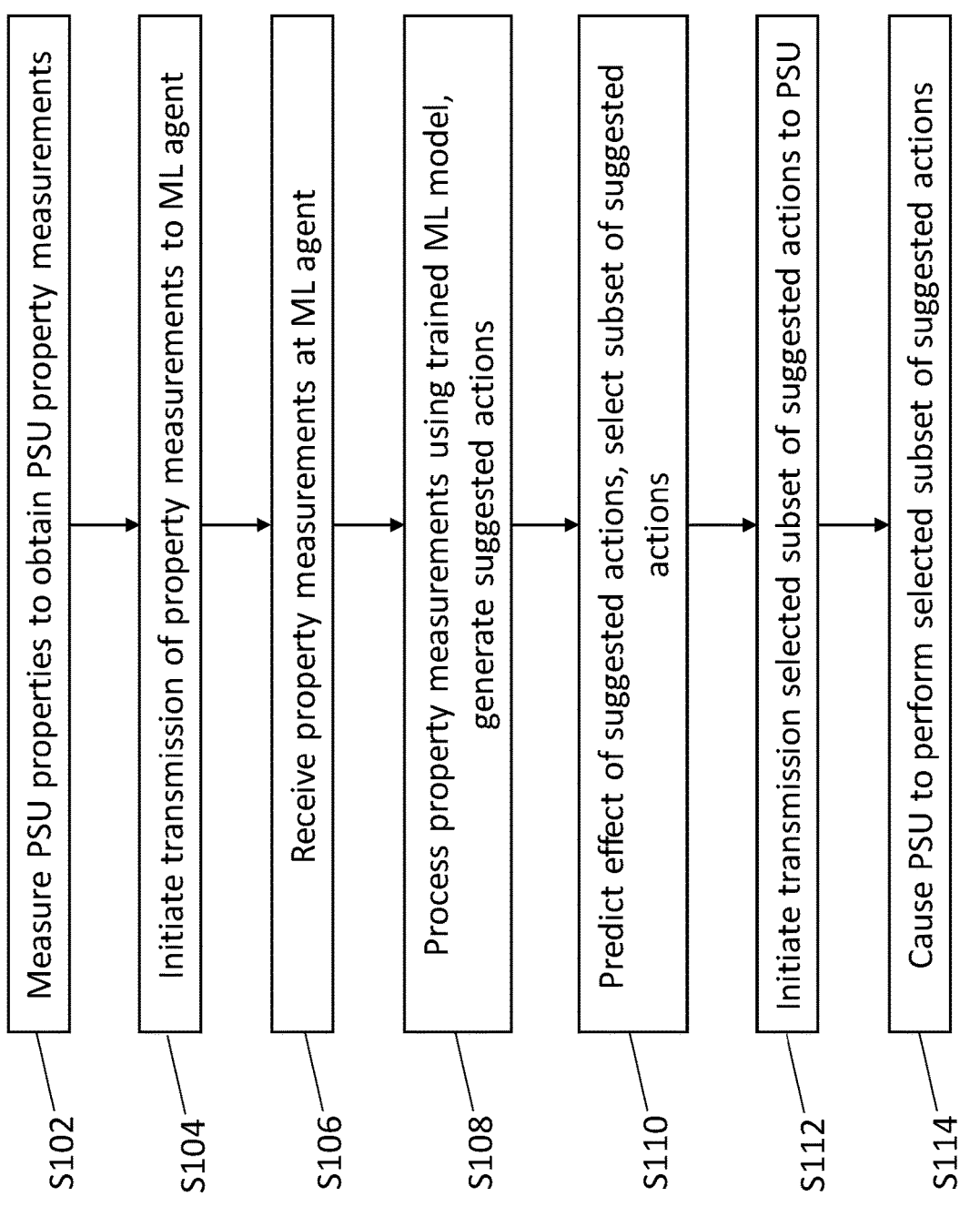

Figure 1

S102 — Measure PSU properties to obtain PSU property measurements

S104 — Initiate transmission of property measurements to ML agent

S106 — Receive property measurements at ML agent

S108 — Process property measurements using trained ML model, generate suggested actions S110 — Predict effect of suggested actions, select subset of suggested actions S112 — Initiate transmission selected subset of suggested actions to PSU S114 — Cause PSU to perform selected subset of suggested actions

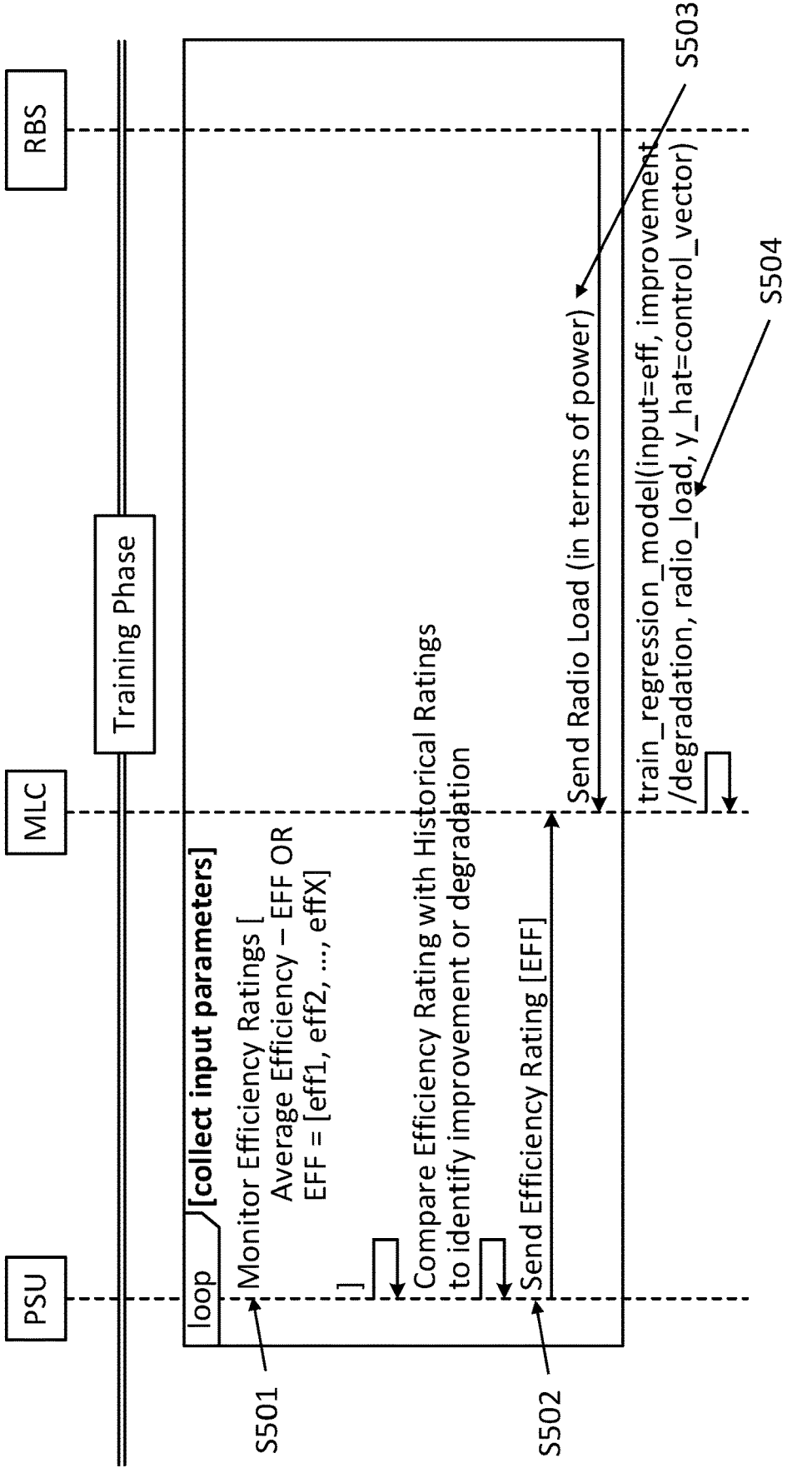
Figure 5A1

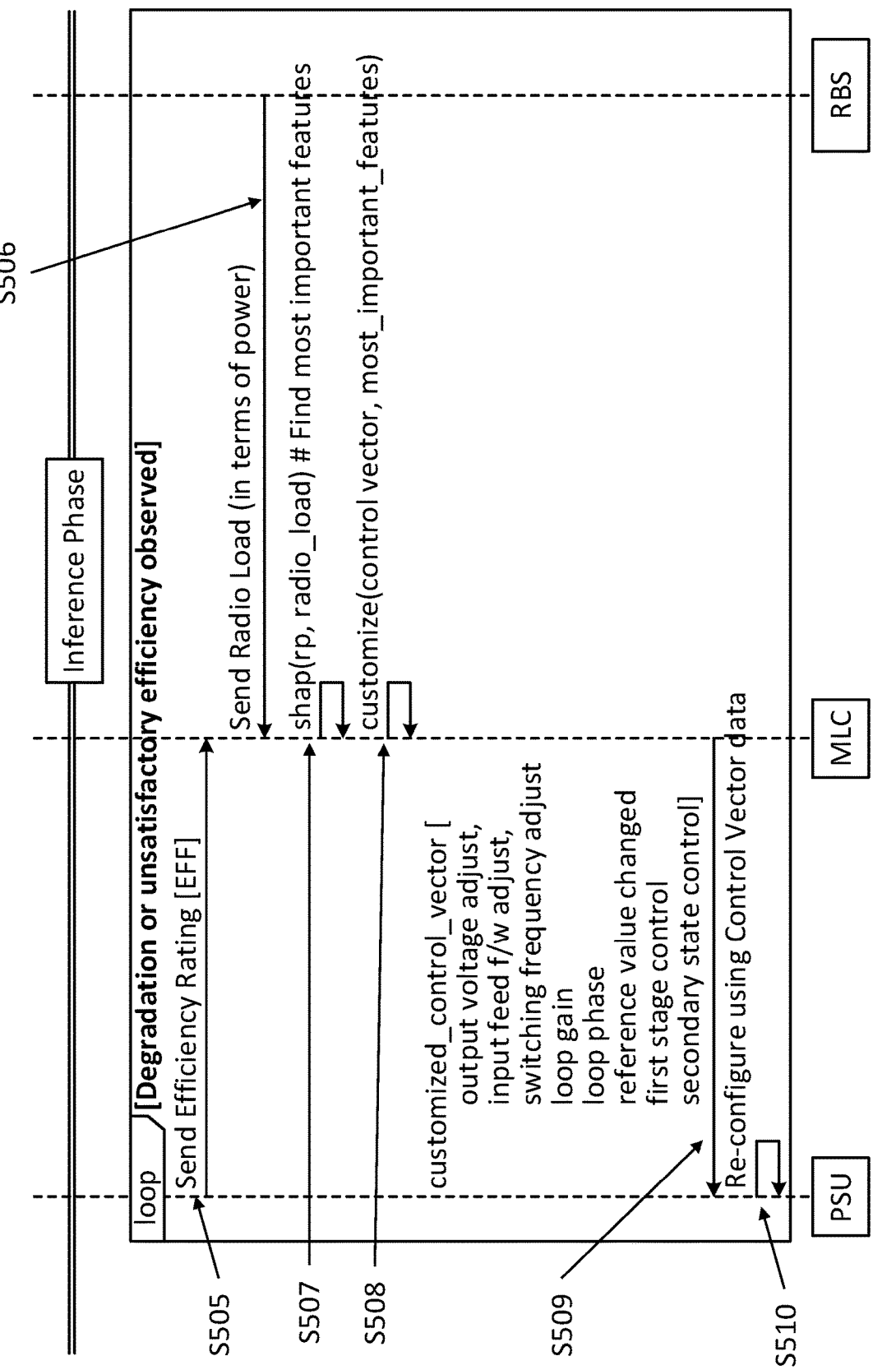
Figure 5A2

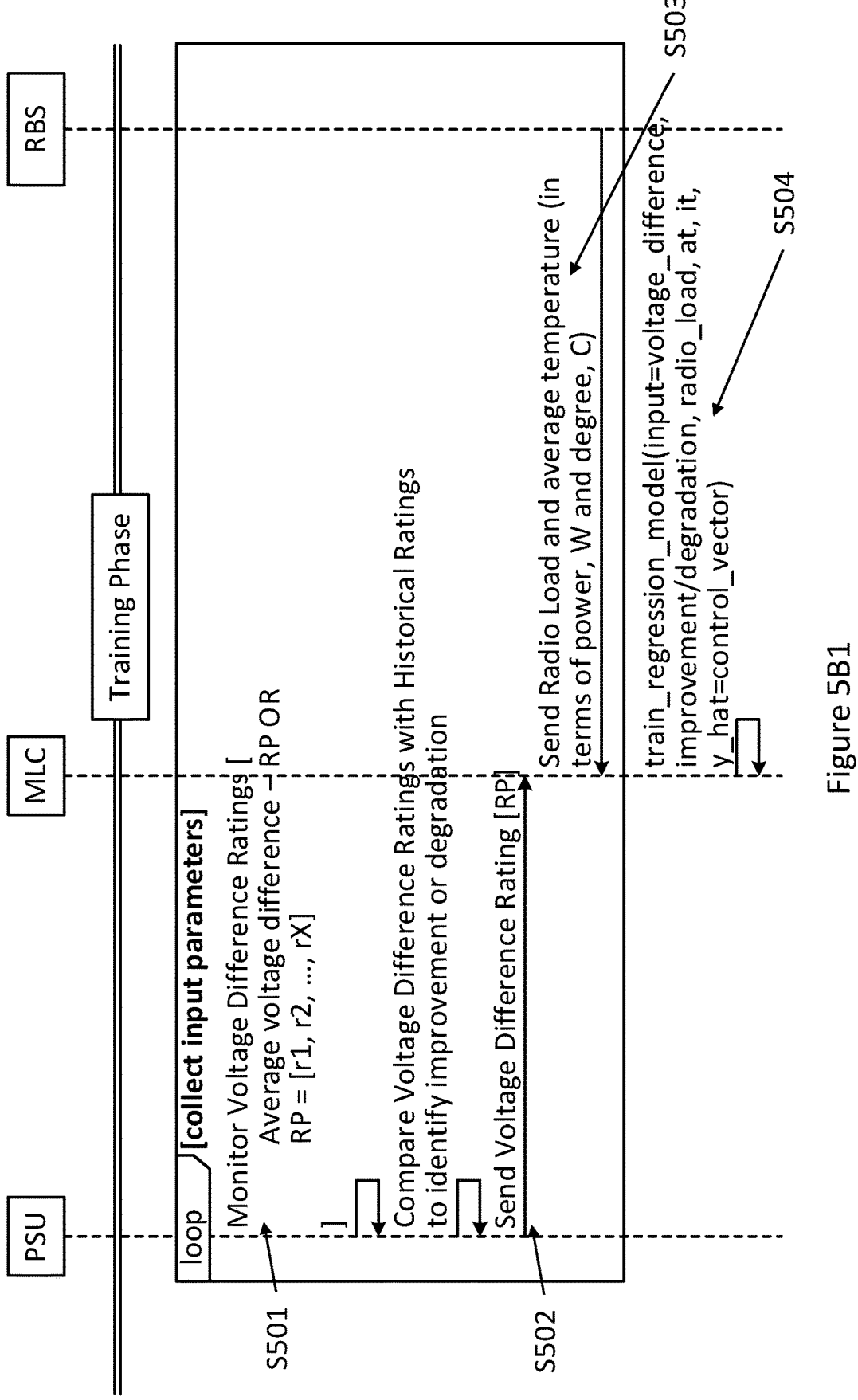
Figure 5B1

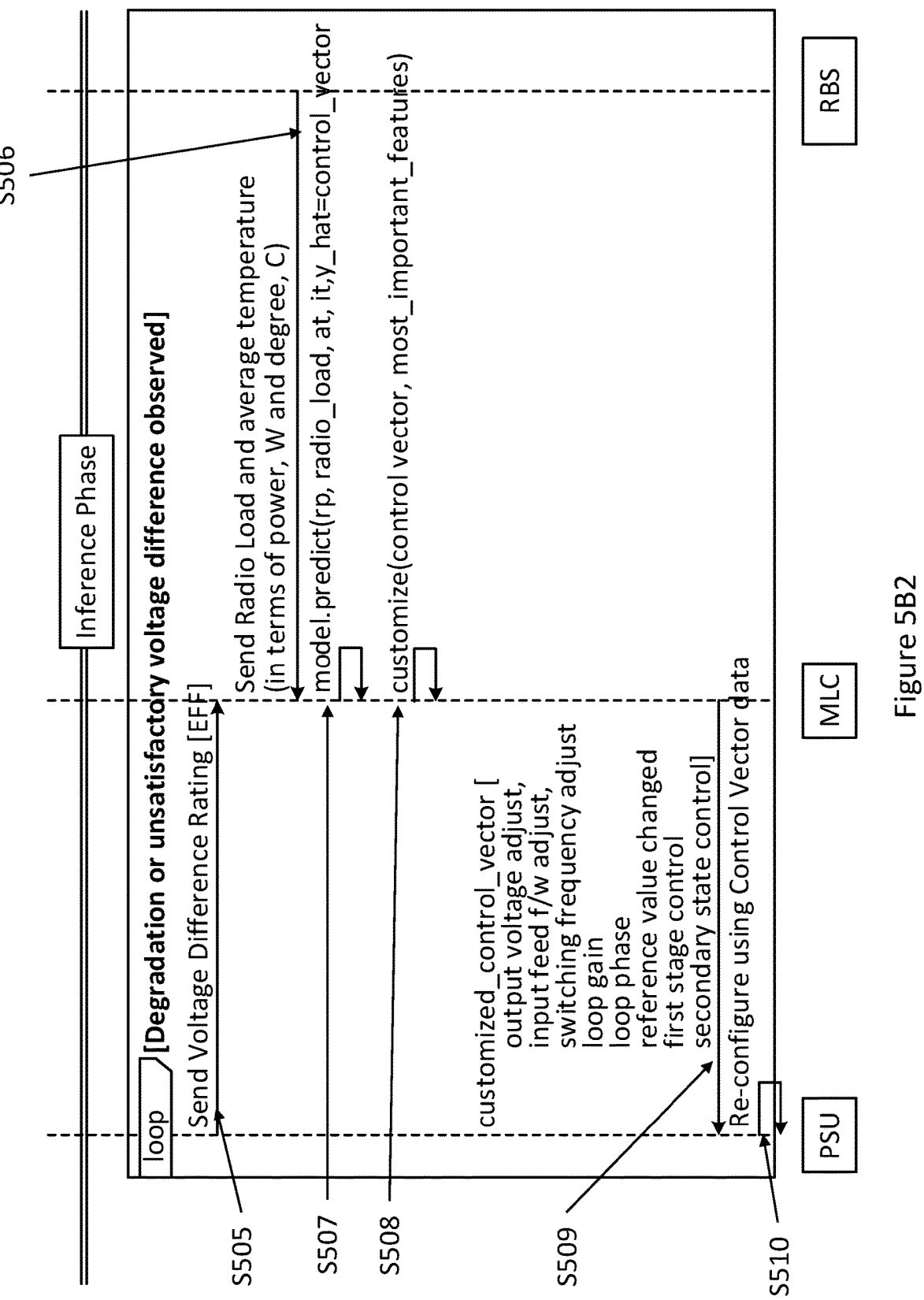
Figure 5B2

POWER SUPPLY CONTROL METHOD

CROSS REFERENCE TO RELATED APPLICATIONS

This application is a 35 U.S.C. § 371 national stage application of PCT International Application No. PCT/EP2021/055128 filed on Mar. 2, 2021, the disclosure and content of which is incorporated by reference herein in its entirety.

TECHNICAL FIELD

Embodiments described herein relate to methods and systems for power supply control, in particular methods and systems for controlling power supply units in communications networks.

BACKGROUND

It is common for power to be provided over mains power networks using Alternating Current (AC), but for components (such as communication network components) to require Direct Current (DC) power to operate. Accordingly, components of communications networks such as Radio Base Stations (RBS) and data centres typically comprise or are connected to a Power Supply Unit (PSU). PSUs are used to convert between AC and DC, and to provide output power in the form required by equipment. By way of example, in a typical RBS, the PSU converts input AC power to regulated DC power, at a voltage that the RBS is configured to use (for example, it is common for RBSs to require −54.5V). Ensuring good operational performance of the PSU is paramount to a well-functioning RBS. The same is true for other components of communications networks, such as data centres, wherein again a correctly operating PSU is essential to a correctly functioning data centre.

The operational efficiency for PSUs (i.e. the fraction of its output power divided by the input power) depends on the output power load and input power, meaning the amount of power (e.g. in Watts) that one or more components are drawing from the PSU and the amount of power provided by a power network as input to the PSU respectively. Additionally, the frequency of the current is also a concern, as variations in the current frequency from an ideal operational value of a PSU can negatively impact the PSU performance.

For some communications network components (such as RBSs), the power load is variable. The amount of data processed by the RBS impacts the amount of power drawn by the RBS from the PSU. Also, it is possible to regulate the input power into the PSU by adjusting input current (Ampere) and PSU switching frequency (kHz). By adjusting some or all of these properties (and also other PSU properties), it is possible to influence the operational efficiency of a PSU. Further, control of the properties (and other PSU properties) can also help to decrease the rate of degradation of the PSU, thereby increasing the PSU lifetime and/or decreasing the frequency at which it is necessary to perform maintenance on the PSU.

Determining how to control a PSU is typically a time consuming and labour intensive task that often requires a substantial amount of work from human experts, potentially including constant PSU performance monitoring by a human expert. It is therefore desirable to provide a system for controlling a PSU to provide increased efficiency and/or lifetime that requires less human input than existing systems.

WO2020126043 discloses a method for optimising a PSU among multiple PSUs in a power system and determining the power headroom among the multiple PSUs. The PSU control is triggered based on the calculated power headroom. WO2020126043 does not disclose a system for optimising individual PSU efficiency; instead disclosing methods for use with a system of multiple PSUs.

SUMMARY

It is an object of the present disclosure to provide methods, systems and computer readable media which at least partially address one or more of the challenges discussed above. In particular, it is an object of the present disclosure to provide power supply unit control that requires minimal amounts of human input, and that may support increased PSU lifetime and/or efficiency.

According to aspects of embodiments there are provided methods of controlling a PSU in a communications network. The methods comprise measuring one or more properties of the PSU to obtain property measurements, and initiating transmission of the property measurements to a ML agent hosting a trained ML model. The methods further comprise receiving the property measurements at the ML agent and processing the received property measurements using the trained ML model to generate suggested actions to be taken by the PSU. The methods further comprise predicting the effect of each of the suggested actions on the measured PSU properties, and selecting a subset of the suggested actions predicted to have a significant impact on the measured PSU properties. The methods further comprise initiating transmission of the selected subset of suggested actions to the PSU and causing the PSU to perform the selected subset of suggested actions. ML modelling of the PSU may allow actions to improve the performance of the PSU (for example, improve the efficiency or reduce degradation) to be suggested. Also, by predicting the effect of the suggested actions and sending a subset of suggested actions to the PSU, the amount of data transmitted to the PSU may be reduced and the risk of destabilising the PSU may also be reduced.

In some aspects of embodiments, the property measurements may comprise one or more of an input voltage and an output voltage of the PSU; a load on the PSU; an ambient temperature experienced by the PSU; an internal temperature of the PSU; a level of airflow recorded at the PSU; and a humidity level recorded at the PSU. Using this information may improve the performance of the PSU following the suggested actions sent by the ML agent.

In some aspects of embodiments, the step of predicting the effect of each of the suggested actions on the measured PSU properties may be performed by analysing the ML model, wherein the ML model may be analysed using XAI ML model interpretation techniques. The use of XAI may allow the selection of the subset of suggested actions to be made efficiently without the requirement for substantial human input.

In some aspects of embodiments, the PSU may form part of a base station of a telecommunications network, or may form part of a data centre. PSUs used in base stations of telecoms networks or data centres may be particularly well suited to receiving instructions (in the form of suggested actions) to improve performance due, for example, to the variable loads and variable operating conditions these PSUs may be subjected to.

According to further aspects of embodiments there are provided PSU control systems in communications networks, the PSU control systems comprising processing circuitry and memories containing instructions executable by the processing circuitry, whereby the PSU control systems are operable to measure one or more properties of a PSU to obtain property measurements, and initiate transmission of the property measurements to a ML agent hosting a trained ML model. The PSU control systems are further operable to receive the property measurements at the ML agent and process the received property measurements using the trained ML model to generate suggested actions to be taken by the PSU. The PSU control systems are further operable to predict the effect of each of the suggested actions on the measured PSU properties, and select a subset of the suggested actions predicted to have a significant impact on the measured PSU properties. The PSU control systems are further operable to initiate transmission of the subset of suggested actions to the PSU and cause the PSU to perform the selected subset of suggested actions. Some of the advantages provided by the PSU control systems may be as discussed above in the context of methods of controlling a PSU in a communications network.

BRIEF DESCRIPTION OF DRAWINGS

The present disclosure is described, by way of example only, with reference to the following figures, in which:

FIG. 1 is a flowchart of a method in accordance with aspects of embodiments;

FIG. 5A (divided into 5A1 and 5A2) and 5B (divided into 5B1 and 5B2) are sequence diagrams of processes in accordance with aspects of embodiments.

DETAILED DESCRIPTION

Figure 2A:
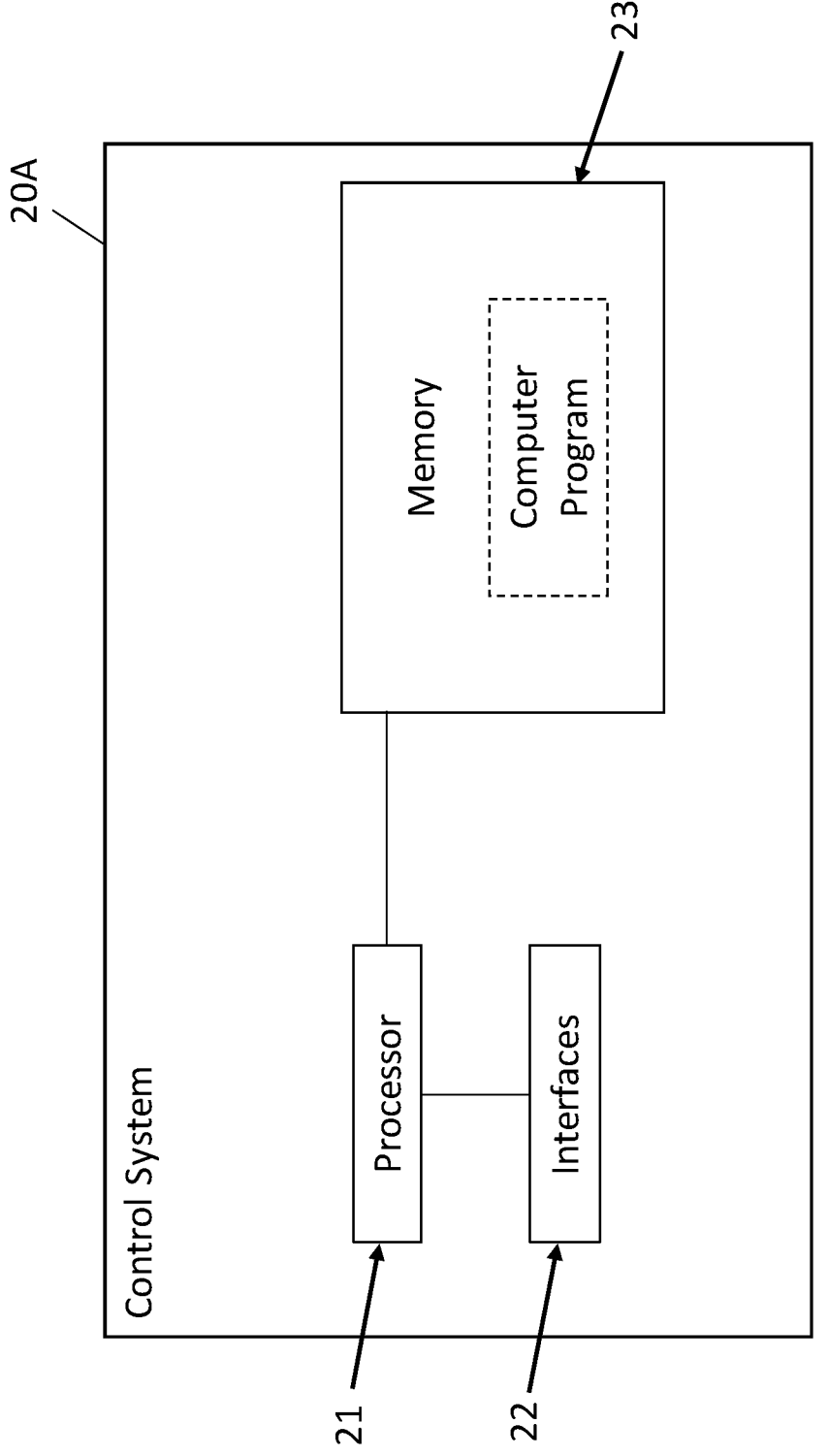
FIGS. 2A and 2B are schematic diagrams of systems in accordance with aspects of embodiments.

For the purpose of explanation, details are set forth in the following description in order to provide a thorough understanding of the embodiments disclosed. It will be apparent, however, to those skilled in the art that the embodiments may be implemented without these specific details or with an equivalent arrangement.

Aspects of embodiments are configured to operate in conjunction with programmable PSUs, wherein properties of the PSU such as one or more of input and output voltage, a load on the PSU, an ambient temperature experienced by the PSU, an internal temperature of the PSU, a level of airflow recorded at the PSU, and a humidity level recorded at the PSU may be measured and adjusted.

A method in accordance with aspects of embodiments is illustrated in the flowchart of FIG. 1. The method may be executed by any suitable control system. Examples of suitable control systems in accordance with aspects of embodiments that are suitable for executing the method are shown schematically in FIG. 2A and FIG. 2B. One or more of the control systems shown in FIGS. 2A and 2B may be incorporated (entirely or in part) into a PSU, and/or may be incorporated into a component that relies on the controlled PSU for power. In some aspects of embodiments the control systems may therefore be incorporated into, for example, a base station or core network node of a telecommunications network or a data centre.

As shown in step S102 of FIG. 1 the method comprises obtaining property measurements for one or more properties of the PSU, by measuring said one or more properties. Different properties may be measured depending on the specific configuration of a given system, and also dependent on a characteristic of the PSU that it is desired to improve. As an example of this, if it is desired to improve the longevity of a PSU, then measurements of the internal and external temperature of the PSU may be relevant; the temperature measurements may be less relevant (although not irrelevant) if it is desired to improve the efficiency of the PSU. The property measurements may be obtained by sensors that may or may not form part of the control system, and which may or may not form part of the PSU (as explained above, the control system may also form part of the PSU). In some aspects of embodiments, the measurements may comprise a series of efficiency measurements, where the efficiency of the PSU is the ratio of power output to power input. The necessary power values can be measured (for example) externally at the input and output of the PSU, or the PSU itself can provide the measurements. Monitoring of efficiency spans some amount of time, so multiple measurements of efficiency spanning the measurement period can be provided (for example, as input in an input vector (e.g. [eff1, . . . , effx]) and/or an average of efficiency over a measurement period can be provided.

In some aspects of embodiments, the property measurements may comprise measurements of an input voltage and/or the difference between a target output voltage and an actual output voltage, which may be referred to as the voltage difference. The target output voltage is the voltage which the PSU is designed to output; as an example of a voltage difference, in a system wherein the PSU is designed to output a voltage of −48V (so the target output voltage is −48V) and the actual output voltage is −49V, the property measurements for this example may indicate a voltage difference of −1V. Again monitoring of the voltage difference spans some amount of time, so multiple measurements of voltage difference spanning the measurement period can be provided (for example, as input in an input vector (e.g. [V1, . . . , Vx]) and/or an average of the voltage difference over a measurement period can be provided.

Figure 2B:
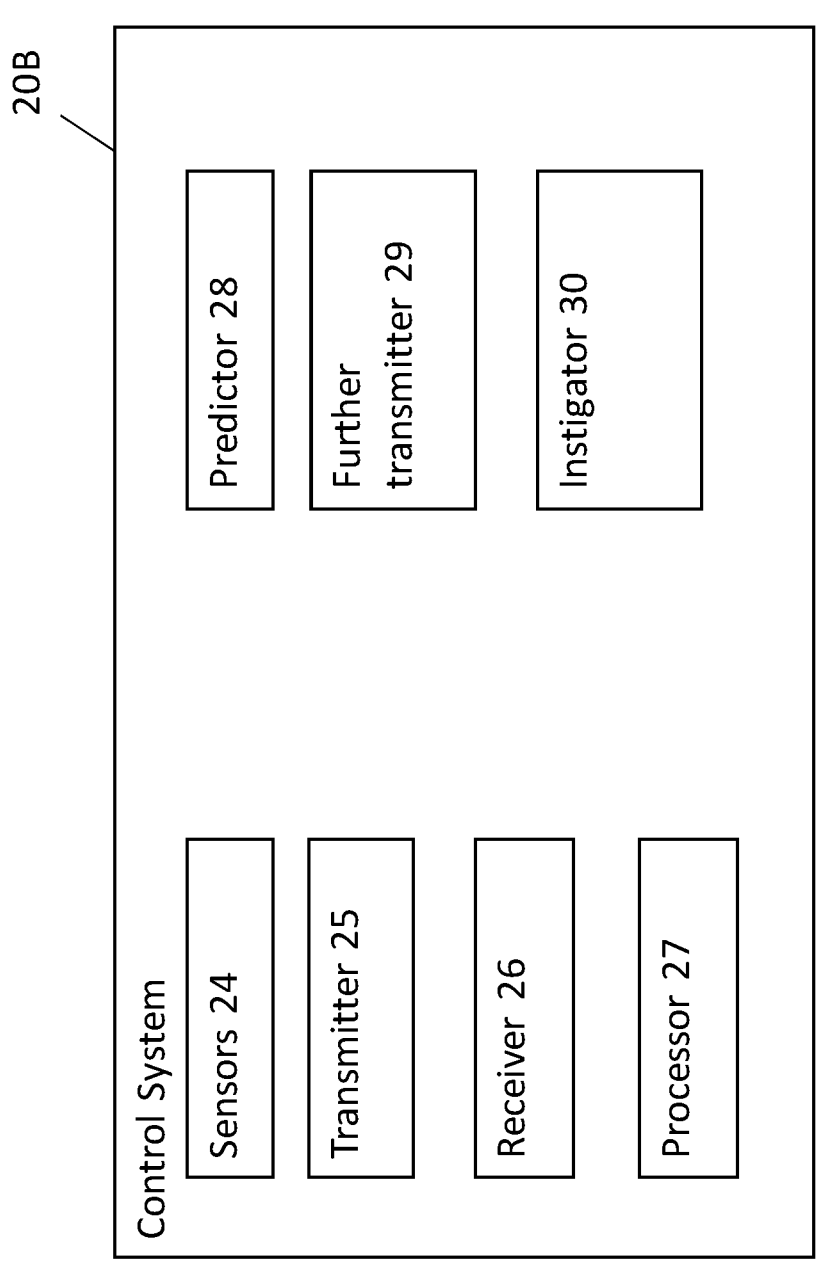

As will be clear to those skilled in the art, measurements of properties of the PSU may be obtained as required depending on the specific configuration of aspects of embodiments. Where a control system 20A in accordance with the aspect of an embodiment shown in FIG. 2A is used, the property measurements may be obtained in accordance with a computer program stored in a memory 23, executed by a processor 21 in conjunction with one or more interfaces 22 (where the interfaces may comprise one or more sensors). Alternatively, where a control system 20B in accordance with the aspect of an embodiment shown in FIG. 2B is used, the property measurements may be obtained by the sensors 24. The measurement data may be collated by a further component, such as a memory unit forming part of the PSU or a separate memory unit located proximate to the PSU, and transmitted in one or more batches. Alternatively, the measurement data may be transmitted directly following measurement with no collation.

Once the measurements of one or more properties of the PSU have been taken, transmission of the property measurements to a machine learning (ML) agent hosting a trained ML model is initiated, as shown in step S104. Where the control system forms part of the PSU, or part of a component (such as a base station) that utilises the PSU, the transmission may comprise transmission from sensors to a memory unit over a simple wire connection. In alternative aspects of embodiments where the PSU is remote from a memory of the control system (for example, where the memory is located in a further node of a communications network, such as a core network node, CNN), the transmission may utilise a more long range wireless or wired connection. The property measurements may be transmitted in any suitable format; an example of a suitable format is as an output vector, with different properties forming different fields of the vector. Where a control system 20A in accordance with the aspect of an embodiment shown in FIG. 2A is used, the property measurements may be transmitted in accordance with a computer program stored in a memory 23, executed by a processor 21 in conjunction with one or more interfaces 22 (where the interfaces may comprise a transmitter). Alternatively, where a control system 20B in accordance with the aspect of an embodiment shown in FIG. 2B is used, the property measurements may be transmitted by the transmitter 25.

The property measurements are then received at the ML agent, as shown in step S106. As explained above, where the control system forms part of the PSU, or part of a component (such as a base station) that utilises the PSU, the reception may comprise receiving data from sensors directly connected to the ML agent (for example, by wired or wireless connection). In alternative aspects of embodiments where the PSU is remote from a memory of the control system, the reception may utilise a suitable wireless or wired receiver. In some aspects of embodiments, the ML model may be hosted by a cloud computing system, which therefore acts as the ML agent. Those skilled in the art will be fully aware of how data may be transmitted over a variety of ranges, as dictated by the requirements of a specific aspect of an embodiment. Where a control system 20A in accordance with the aspect of an embodiment shown in FIG. 2A is used, the property measurements may be received in accordance with a computer program stored in a memory 23, executed by a processor 21 in conjunction with one or more interfaces 22 (where the interfaces may comprise a receiver). Alternatively, where a control system 20B in accordance with the aspect of an embodiment shown in FIG. 2B is used, the property measurements may be received by the receiver 26.

The received property measurements are then processed using a trained ML model, as shown in step S108. Any suitable ML model may be used, for example, a neural network, boosted regression tree, Long Short-Term Memory (LSTM) model, AutoRegressive Integrated Moving Average (ARIMA) model, and so on. The trained ML model is used to model the behaviour of the PSU, in particular, to model the response of the PSU to adjustments in one or more of the properties of the PSU. In some aspects of embodiments, the method may further comprise training the ML model; in alternative aspects of embodiments a trained ML model obtained from a model database may be utilised. In aspects of embodiments wherein the ML model is trained, the training may utilise a training data set obtained, for example, from a simulation of a PSU. Alternatively, the model may be trained using a data set obtained from an operational PSU. Any suitable training method may be used to train the ML model, for example, supervised learning or reinforcement learning may be utilised. Further, classification or regression techniques may be used. Where classification is used, the target variables are grouped into "buckets" or "ranges of values" (also referred to as "classes"), for example output voltage adjustment could be in ranges of [−50, −54], [−54, −58] and so on. Given certain input variables, the trained ML model could then indicate which range the target variable could be within, and the probability of the target variable being in that range. Where regression is used, the trained ML model would predict explicit values for the target variables, e.g. output voltage adjustment would be −54.5 V, or increment of voltage adjustment could be 0.5 V.

Taking the example of supervised learning using regression, an example data sample of the sort that may be used to train a ML model is shown in Table 1 below. The training dataset consists of input parameters for efficiency ratings and radio load and the target variable for each sample contains the expected adjustments to output voltage, input/feed voltage and switching frequency per time step.

TABLE 1

| Input Variables | | | Target Variables (or labels) | | |
|---|---|---|---|---|---|
| Efficiency/ Ratings (sorted by Time) | Improvement/ Degradation | Radio Load (in kW) | Output Voltage Adjust (V) | Input/Feed Voltage (V) | Switching Frequency Adjust (kHz) |
| <220, −48>, <220, −47> | False, False | 1, 1 | [−54.5] | [+2] | [301] |

In the Table 1 example, the state of the PSU is represented by the efficiency ratings, whether there is any improvement or degradation in the efficiency and the radio load (these property measurements may be transmitted to a trained ML agent in the form of an output vector). The adjustments (suggested actions to be taken) are provided in the form of a control vector consisting of an output voltage adjustment field, input feed adjustment field and switching frequency adjustment field. The 3 individual adjustment are all vectors (for example, the output voltage adjustment field may contain the values [−54.5, −55, −56]) and each value represents what adjustment needs to be made at each time step (for the above example, at time step=0 change voltage to −54.5 V, at time step=1 change voltage to −55 V, and so on). Alternatively, where the adjustments are made using a standard increment, each value could indicate how many standard increments are to be used in each adjustment (for example, where the voltage is always adjusted in increments of 0.5 V, an adjustment of −1.5 V could be indicated using a value of −3). Where a standard increment is used, this information may be passed to the ML agent, to improve the accuracy of the ML agent suggested actions. In a further example utilising a larger time window, larger numbers of values may be included in each field, for example 10 values per field.

In a further examples reinforcement learning may be used to train the ML model; suitable reinforcement learning techniques include policy-learning techniques, such as actor-critic and value-learning techniques, such as deep-q learning with deep-q networks (DQNs).

Where actor-critic techniques are used, the ML agent hosts two networks: an actor network (such as a LSTM) and a critic network (the critic is a state value function and may use, for example a Convolutional Neural Network, CNN). The actor uses a ML model to analyse the state of the system (this may be indicated by the input variables shown in Table 1, for example) and determine what actions (the actions may be the target variables from Table 1, for example) are selected. The critic evaluates each action the actor outputs and generates a corresponding reward (typically a scalar value). Based on the reward, the actor updates the ML model (i.e., through retraining). The update process is iterative; typically the end condition is the performance of the actor (ML model) becoming acceptable, that is, consistently obtaining good rewards from the critic. Over time, the critic becomes better at evaluating the value of states, and therefore the actor becomes better at predicting "good" actions approximating optimal actions to be taken for a given state (of the PSU).

Where deep q-learning techniques are used, a single network (such as a deep neural network) is used to train a ML model based on a reward that is generated by a suitable equation (rather than by a critic, as is the case with actor-critic techniques). This network is known as deep-q network (DQN). An example of a suitable equation that can be used to calculate the reward for a deep-Q learning approach, and for the case wherein the operation of the PSU is to be optimised is:

$$R_t = W_{in}(V_{PSUin} / V_{REFin}) + W_{out}(|V_{PSUout}| / |V_{REFout}|); \Sigma(W_{in}, W_{out}) = 1$$

Where: $R_t$ indicates the reward at time t; $W_{in}$ is the power input in to the PSU; $W_{out}$ is the power output from the PSU; $V_{PSUin}$ and $V_{PSUout}$ are the voltage into and out of the PSU at time t, respectively; and $V_{REFin}$ and $V_{REFout}$ are reference voltages, for example $V_{REFin}$ may be 220 V and $V_{REFout}$ may be −48 V. An alternative (simpler) suitable equation is:

$$R_t = |V_{PSUout}| / |V_{REFout}|$$

Where reinforcement learning is used, the ML model is trained to approximate the optimal action based on the state of, and reward from, an environment (the PSU). The optimal action is the target variables to yield the best efficiency benefits. Those skilled in the art will appreciate how various training techniques may be selected and used as required.

Once trained the ML model is then used to process the property measurements from the PSU. The ML model is trained such that, given a current state of the PSU (as provided by the property measurements), the ML model can predict the response of the PSU to certain actions, and can therefore suggest a number of actions which may be performed to alter (improve) the PSU properties. The actions may comprise adjusting the output voltage the PSU is configured to provide, adjusting the PSU switching frequency, input voltage feed adjustment, improving the airflow through the PSU (by activating a fan, for example), activating or deactivating different stages of a power supply unit (where multiple stages are present), and so on. Where a control system 20A in accordance with the aspect of an embodiment shown in FIG. 2A is used, the property measurements may be processed to generate suggested actions in accordance with a computer program stored in a memory 23, executed by a processor 21 in conjunction with one or more interfaces 22 (where the interfaces may comprise a receiver). Alternatively, where a control system 20B in accordance with the aspect of an embodiment shown in FIG. 2B is used, the property measurements may be processed in order to generate suggested actions by the processor 27.

Although all of the actions suggested by the trained ML model may alter the PSU properties, aspects of embodiments do not automatically transmit all of the suggested actions to the PSU for implementation when the actions are suggested by the trained ML model. Instead, as shown in step S110, the effect of each of the suggested actions on the measured PSU properties is predicted, such that a subset of the suggested actions that are predicted to have a significant impact on the measured PSU properties can be selected. The subset of actions may be selected on the basis of which of the suggested actions are predicted to have the most beneficial effect on the PSU, for example, provide the largest increase in PSU efficiency.

Transmitting only a subset of the suggested actions (instead of all of the suggested actions) provides benefits in terms of reducing the amount of data transmitted (which may be of particular benefit where data is transmitted over a connection of limited bandwidth). Further, transmitting only a subset of suggested actions may assist in maintaining the stability of the PSU. If a large number of PSU parameters are adjusted simultaneously or in quick succession (as a result of the PSU receiving a large number of suggested actions), there is a potential risk of destabilising the PSU and/or causing systemic effects. By transmitting only a subset of the suggested actions, the potential risk of destabilisation may be reduced. Further, if the subset of suggested actions to be transmitted is selected based on which suggested actions are predicted to have a significant impact on the measured PSU properties, then a significant improvement of the PSU characteristics can be provided while avoiding a high risk of PSU destabilisation.

Figure 3:
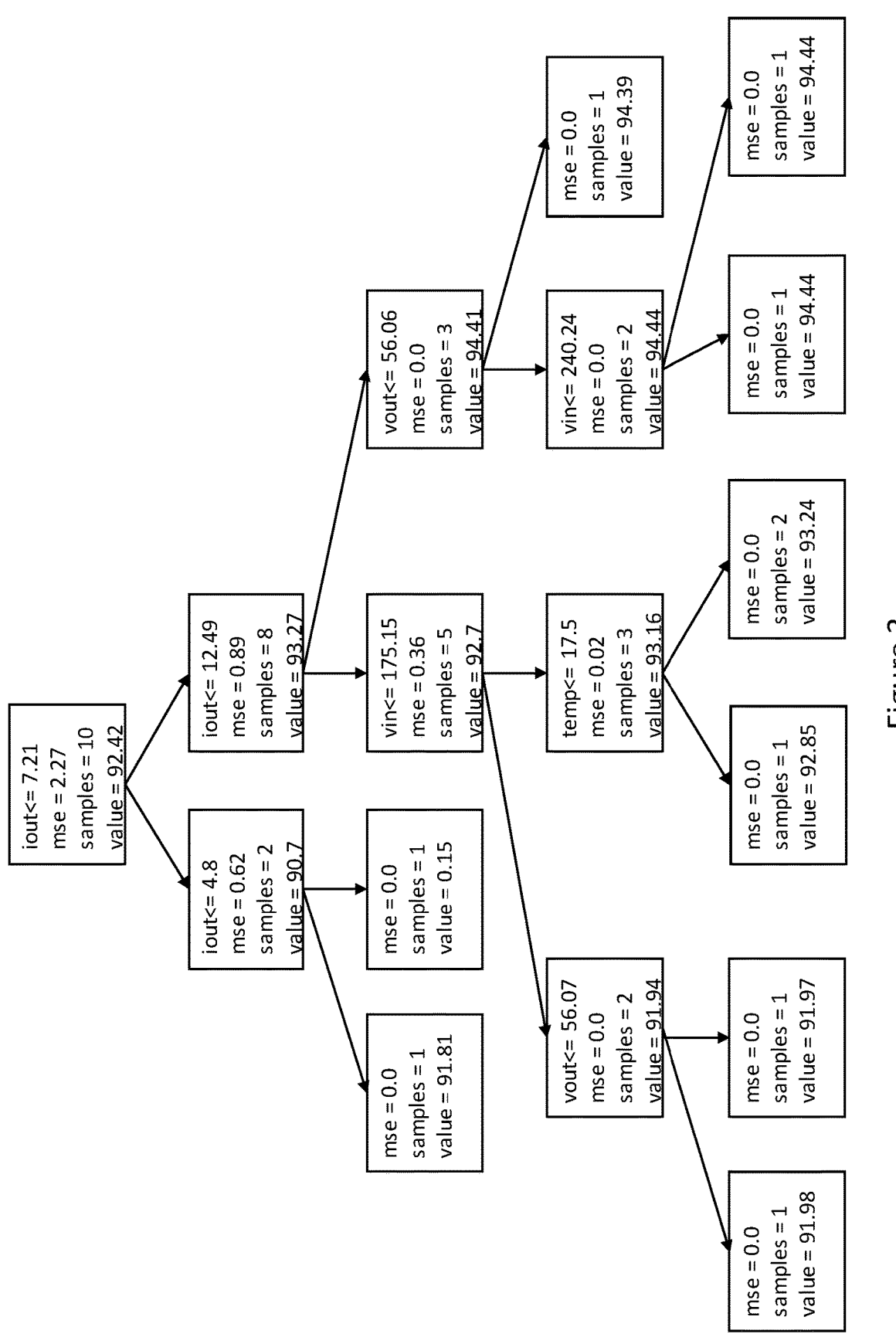
FIG. 3 is a schematic diagram of an example of a decision tree.

The effect of each of the suggested actions on the measured PSU properties may be performed by analysing the ML model, for example, by using model interpretation techniques. In particular, eXplainable Artificial Intelligence (XAI) ML model interpretation techniques may be used; examples of XAI ML model interpretation techniques include SHapley Additive exPlanations (SHAP) analysis, Local Interpretable Model-agnostic Explanations (LIME) analysis, and eXtreme Gradient Boosting (XGBoost). ML model interpretation techniques are used to identify why a ML model returns a given output when provided with given inputs. The LIME method is discussed in greater detail in ""Why Should I Trust You?": Explaining the Predictions of Any Classifier" by Ribeiro, M. T., Singh, S. and Guestrin, C.; ACM SIGKDD International Conference on Knowledge Discovery and Data Mining (KDD), 2016; available at https://arxiv.org/abs/1602.04938 as of 17 Feb. 2021. The additive ML model analysis technique SHAP is discussed in greater detail in "A Unified Approach to Interpreting Model Predictions" by Lundberg, S. M. and Lee, S-I, NIPS Conference 2017, available at https://papers.nips.cc/paper/7062-a-unified-approach-to-interpreting-model-predictions as of 17 Feb. 2021. XGBoost is discussed in greater detail at https://xgboost.readthedocs.io/en/latest/ (as of 17 Feb. 2021). Each of the XAI techniques uses as an input a set of suggested actions, and also the trained ML model. The methodology the different XAI techniques use to process the inputs is as follows: SHAP and LIME calculate impact values (eg SHAP values) for the trained ML model and for the set of samples with and without each feature of the model, and then by sorting these impact values obtain predictions of how each suggested action may alter the PSU performance. XGBoost uses a representation of the suggested actions as boosted tree, wherein the suggested action importance is provided by tracking coefficients of every node in the tree. Suggested actions that are higher in the tree (have a high coefficient) are predicted to have a more substantial effect on the PSU performance than features that are low. A schematic diagram of an example of a decision tree, of the sort used with XGBoost model interpretation techniques, is shown in FIG. 3. The example decision tree shown in FIG. 3 may be used to increase the efficiency of the PSU to which it relates. In the decision tree, the coefficient value in each node indicate the efficiency, with higher values indicating higher efficiency. The number of samples in each node and the mean squared error (MSE) on the values is also given. The importance of PSU parameters on the efficiency can be determined using the value coefficients; the FIG. 3 example considers the importance of the output current (iout), input voltage (vin) and output voltage (vout) of the PSU. From analysis of FIG. 3, it can be determined that the relative importances of the considered parameters, in descending order of importance, is iout, vin, vout.

Once the effect of each of the suggested actions has been predicted, a selection is made of a subset of the suggested actions predicted to have a significant impact on the measured PSU properties. The size of the subset may vary depending on the number of actions a given PSU can perform simultaneously or in quick succession, potentially taking into consideration the risk of destabilising the PSU. The subset of actions may be selected based on the impact on one or more particular characteristics of the PSU, for example, to have a significant improvement effect on the operational efficiency of the PSU or to significantly reduce the degradation of the PSU. The selection may utilise a series of rules, prioritizing certain features depending on which characteristics are of most importance, in addition to using the analysis of the ML model as discussed above. An example of a series of rules may specify that, if satisfying the radio load is an important characteristic then suggested actions involving output voltage adjustments and input feed adjustments may be selected. If the efficiency rating of the PSU is an important characteristic, then output voltage adjustments, input feed adjustments, loop gain adjustments and loop phase adjustments may be selected. The series of rules may effectively be used to incorporate knowledge relating to the operation of the PSU into the selection of the subset of actions. The knowledge may be expert knowledge provided by a human expert (such as a PSU manufacturer or operator, for example). Further the rules may be updated to incorporate knowledge obtained during the operation of the PSU. The rules may restrict which suggested actions may be selected, but the selection is ultimately determined by the predictions of the effect of the suggested actions using the ML model analysis.

The selected subset of suggested actions may also or alternatively be limited to actions having an impact above a predetermined threshold (for example, improving operational efficiency by at least 0.5%), limited to a certain number of actions (for example, a subset of no more than 3 actions), or limited in any other suitable way depending on the particular system configuration. Where a control system 20A in accordance with the aspect of an embodiment shown in FIG. 2A is used, the prediction of the effects of suggested actions and selection of a subset may be performed in accordance with a computer program stored in a memory 23, executed by a processor 21 in conjunction with one or more interfaces 22 (where the interfaces may comprise a receiver). Alternatively, where a control system 20B in accordance with the aspect of an embodiment shown in FIG. 2B is used, the prediction of the effects of suggested actions and selection of a subset may be performed by the predictor 28.

The selected subset of suggested actions is then transmitted to the PSU, as shown in step S112. Where the control system that comprises the ML agent forms part of the PSU, or part of a component (such as a base station) that utilises the PSU, the transmission may comprise transmission over a simple wire connection. In alternative aspects of embodiments where the PSU is remote from a ML agent of the control system (for example, where the ML agent is located in a further node of a communications network, such as a core network node, CNN, or is hosted in a cloud computing system), the transmission may utilise a more long range wireless or wired connection. Where a control system 20A in accordance with the aspect of an embodiment shown in FIG. 2A is used, the subset of selected actions may be transmitted in accordance with a computer program stored in a memory 23, executed by a processor 21 in conjunction with one or more interfaces 22 (where the interfaces may comprise a transmitter). Alternatively, where a control system 20B in accordance with the aspect of an embodiment shown in FIG. 2B is used, the subset of selected actions may be transmitted by the further transmitter 29. The subset of suggested actions may be transmitted to the PSU in any suitable format; an example of a suitable format is as a control vector, such as the example control vector shown in Table 1. As a subset of the selected actions are sent to the PSU, some fields of a control vector may be omitted (where a control vector is used to send the subset of selected actions). Returning to the example of a control vector illustrated in Table 1, the control vector may contain fields specifying selected actions involving controlling output voltage and input feed adjustment, and omit other fields (such as the switching frequency adjustment field in the example shown in Table 1).

The PSU is then cause to perform the subset of selected actions, as shown in step S114. Where a control system 20A in accordance with the aspect of an embodiment shown in FIG. 2A is used, the PSU may be caused to perform the selected subset of suggested actions in accordance with a computer program stored in a memory 23, executed by a processor 21 in conjunction with one or more interfaces 22. Alternatively, where a control system 20B in accordance with the aspect of an embodiment shown in FIG. 2B is used, the PSU may be caused to perform the selected subset of suggested actions by the instigator 30. Where the control system forms part of the PSU, or part of a component (such as a base station) that utilises the PSU, the control system may directly control the PSU to cause the subset of selected actions to be implemented. Alternatively, where the control system does not form part of the PSU, the subset of suggested actions may be received by a controller of the PSU and implemented.

Figure 4A:
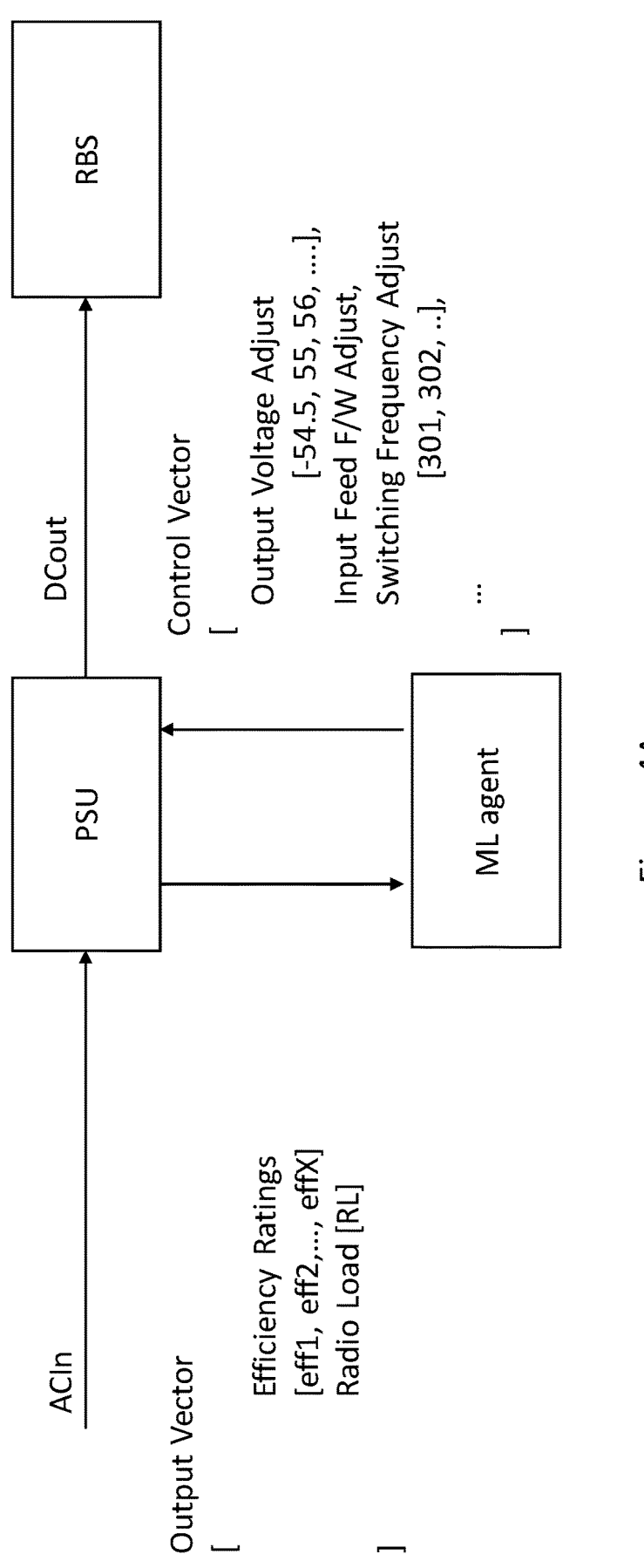
FIGS. 4A and 4B are schematic diagrams providing overviews of PSU systems in accordance with aspects of embodiments.
Figure 4B:
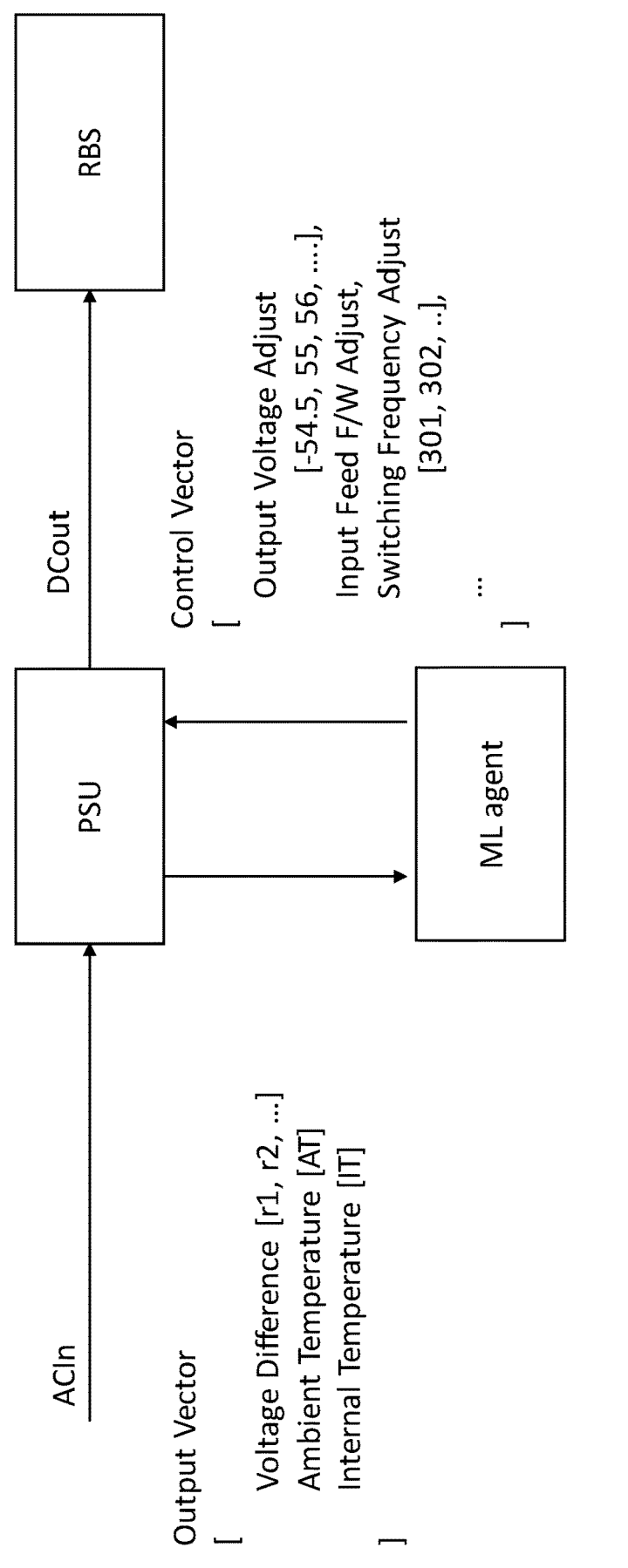

FIG. 4A and FIG. 4B (collectively FIG. 4) are schematic diagrams providing overviews of systems in accordance with aspects of embodiments. Both FIG. 4A and FIG. 4B show a PSU receiving AC power (ACIn), and outputting DC power (DCout) for use by a radio base station (RBS). The PSU in each figure exchanges data with a ML agent. More specifically, in FIG. 4 the PSU transmits property measurements to the ML agent in the form of an Output Vector, and receives a subset of suggested actions to be performed in the form of a Control Vector. FIG. 4A shows a system in which the characteristic of the PSU to be improved, which influences the selection of suggested actions, is the operational efficiency of the PSU. FIG. 4B shows a system in which the characteristic of the PSU that influences which of the suggested actions is selected is the degradation of the PSU.

As explained above, the choice of characteristic of the PSU to be improved may determine which of the suggested actions are selected and ultimately performed by the PSU. The characteristic to be improved may also determine what property measurements are transmitted to the ML agent by the PSU. In the example shown in FIG. 4A, the property measurements transmitted to the ML agent, in the form of an output vector, are efficiency ratings of the PSU and the radio load to which the PSU is subjected (by the RBS). In the example shown in FIG. 4B, the property measurements transmitted to the ML agent, in the form of an output vector, are voltage difference measurements (as explained above, the difference between a target output voltage and an actual output voltage), external (ambient) temperature measurements and internal temperature measurements. In both FIG. 4A and FIG. 4B, the ML agent transmits a subset of suggested actions to the PSU in the form of a control vector; the information included in the control vector is determined based on the effect of the suggested actions, as explained above.

FIG. 5A1, FIG. 5A2, FIG. 5B1 and FIG. 5B2 (collectively FIG. 5) are sequence diagrams. FIG. 5A corresponds to FIG. 4A and FIG. 5B corresponds to FIG. 4B. In the aspects of embodiments to which FIG. 5 relates, the ML model is trained using data from the PSU. The sequence diagrams in both FIG. 5A and FIG. 5B are therefore split into two phases; a training phase (in which the ML model is trained) and an inference phase (in which the trained ML model provides suggested actions to the PSU). The training phases are shown in FIG. 5A1 and FIG. 5B1, and the inference phases are shown in FIG. 5A2 and FIG. 5B2.

As indicated in FIG. 5A1, during the training phase the ML agent (MLC in FIG. 5) collects a number of property measurements (input parameters) from the PSU in the form of efficiency ratings; the properties are measured in step S501, and sent to the ML agent in step S502. In the aspect of an embodiment shown in FIG. 5A1, each efficiency rating is a 3-tuple <AC_Power_IN, DC_Power_Out, Timestamp>. In FIG. 5B1, the property measurements are voltage difference ratings The property measurements may be retrieved from PSU periodically or on request, and each transmission of the efficiency ratings may comprise a plurality of efficiency ratings (covering a period of time). In addition, the MLC also receives property measurements indicating the Radio Load due to the RBS (in terms of voltage level and Power value—i.e., electrical load in terms of kVV); this information is shown as being received from the RBS in FIG. 5A1 step S503, however the information may be received from the PSU as shown in FIG. 4. In the aspect of an embodiment shown in FIG. 5B1, the ML agent collects equivalent voltage difference information from the PSU. Other measurements such as temperature measurements may also be collected, as shown in S503 of FIG. 5B1.

In both the FIG. 5A1 and FIG. 5B1 examples the collected property measurements are used by the ML agent to train the ML model, as shown in step S504. As discussed above, any suitable training method may be used; examples of suitable training methods include supervised learning and reinforcement learning, as will be familiar to those skilled in the art.

The inference phases are shown in FIGS. 5A2 and 5B2. In the inference phase, the ML agent receives property measurements measured by the PSU (see step S505); again FIG. 5 shows radio load information indicating the load on the PSU being received directly from the RBS (see step S506), this information may also be received from the PSU. As shown in FIG. 5B2, additional information such as temperature measurements may also be received. Using the received property measurements and the trained ML model, the ML agent then generates suggested actions, then using XAI techniques (in the examples of FIG. 5A and FIG. 5B, using SHAP) a subset of the suggested actions predicted to have a significant impact on the measured PSU properties are selected (see step S507). A customized control vector is then generated using the selected subset of suggested actions (see step S508), and used to transmit the selected subset of the suggested actions to the PSU (see step S509), which then reconfigures using the information from the control vector (see step S510).

Using ML modelling, aspects of embodiments allow control of PSUs in a way that may improve performance, for example, by improving efficiency or decreasing degradation of the PSUs. Further, by predicting the effect of each suggested action suggested by a trained ML model and then selecting a subset of the selected actions for sending to (and implementing by) the PSU, aspects of embodiments may reduce the amount of data transmitted to PSUs, and may also reduce the risk of PSUs becoming destabilised. Aspects of embodiments may also or alternatively provide improved degradation estimation for PSUs, establishing a better fault accuracy estimation for maintenance. Aspects of embodiments are suitable for use with PSUs in a variety of different situations, but are particularly well suited to use with PSUs supplying power for base stations in communication networks or for data centres. Aspects of embodiments may be suitable for incorporation into new or existing systems.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure. For the avoidance of doubt, the scope of the disclosure is defined by the claims.

The invention claimed is:

1. A method of controlling a Power Supply Unit, PSU, in a communications network, the method comprising:
    measuring one or more properties of the PSU to obtain property measurements;

initiating transmission of the property measurements to a machine learning, ML, agent hosting a trained ML model;
    receiving the property measurements at the ML agent;
    processing the received property measurements using the trained ML model to generate suggested actions to be taken by the PSU;
    predicting the effect of each of the suggested actions on the measured PSU properties, and selecting a subset of the suggested actions predicted to have a significant impact on the measured PSU properties;
    initiating transmission of the selected subset of suggested actions to the PSU; and
    causing the PSU to perform the selected subset of suggested actions.

2. The method of claim 1, wherein the one or more properties of the PSU comprise an input voltage and an output voltage.

3. The method of claim 2, wherein the one or more properties of the PSU further comprise at least one of:
    a load on the PSU;
    an ambient temperature experienced by the PSU;
    an internal temperature of the PSU;
    a level of airflow recorded at the PSU; and
    a humidity level recorded at the PSU.

4. The method of claim 1, wherein data showing measurements of the one or more properties of the PSU over a period of time are transmitted to the ML agent, the data for each of the one or more properties being transmitted as:
    either a series of values from across the period of time; or
    an average value for the period of time.

5. The method of claim 1, further comprising training the ML model.

6. The method of claim 5, wherein the ML agent is trained using supervised learning, or wherein the ML agent is trained using reinforcement learning.

7. The method of claim 5, wherein the ML model is trained using a training data set, or wherein the ML model is trained using data from the PSU.

8. The method of claim 1, wherein the step of predicting the effect of each of the suggested actions on the measured PSU properties is performed by analysing the ML model.

9. The method of claim 8, wherein the ML model is analysed using explainable Artificial Intelligence, XAI, ML model interpretation techniques.

10. The method of claim 9, wherein the XAI ML model interpretation techniques comprise one or more of:
    SHapley Additive exPlanations, SHAP, analysis;
    Local Interpretable Model-agnostic Explanations, LIME, analysis;
    Eli5 analysis; and
    eXtreme Gradient Boosting, XGBoost.

11. The method of claim 1, wherein the subset of selected actions are selected to improve a characteristic of the PSU.

12. The method of claim 11, wherein the characteristic is the operational efficiency of the PSU, or wherein the characteristic is the degradation of the PSU.

13. The method of claim 1, wherein the subset of suggested actions are transmitted to the PSU in the form of a set of control values.

14. The method of claim 1, wherein the ML agent forms part of the PSU.

15. The method of claim 1, wherein the PSU forms part of a base station of a telecommunications network, or wherein the PSU forms part of a data centre.

16. A Power Supply Unit, PSU, control system in a communications network, comprising processing circuitry and a memory containing instructions executable by the processing circuitry, whereby the PSU control system is operable to:

measure one or more properties of a PSU to obtain property measurements;

initiate transmission of the property measurements to a machine learning, ML, agent hosting a trained ML model;

receive the property measurements at the ML agent;

process the received property measurements using the trained ML model to generate suggested actions to be taken by the PSU;

predict the effect of each of the suggested actions on the measured PSU properties, and select a subset of the suggested actions predicted to have a significant impact on the measured PSU properties;

initiate transmission of the subset of suggested actions to the PSU; and cause the PSU to perform the selected subset of suggested actions.

17. The control system of claim 16, wherein the one or more properties of the PSU comprise an input voltage and an output voltage.

18. The control system of claim 17, wherein the one or more properties of the PSU further comprise at least one of:

a load on the PSU;

an ambient temperature experienced by the PSU;

an internal temperature of the PSU;

a level of airflow recorded at the PSU; and a humidity level recorded at the PSU.

19. The control system of claim 16, further configured to transmit data showing measurements of the one or more properties of the PSU over a period of time to the ML agent, the data for each of the one or more properties being transmitted as:

either a series of values from across the period of time; or an average value for the period of time.

20. The control system of claim 16, wherein the control system is further configured to train the ML model.

* * * * *